US009871673B2

(12) United States Patent
Muetzel et al.

(10) Patent No.: US 9,871,673 B2
(45) Date of Patent: Jan. 16, 2018

(54) MULTIPLE DEVICE TELEMETRY NETWORK

(71) Applicant: ZF Friedrichshafen AG, Friedrichshafen (DE)

(72) Inventors: Ronald Muetzel, Hawthorn Woods, IL (US); Thomas Roesch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1197 days.

(21) Appl. No.: 13/800,251

(22) Filed: Mar. 13, 2013

(65) Prior Publication Data
US 2016/0204958 A1    Jul. 14, 2016

(51) Int. Cl.

| | |
|---|---|
| H04W 84/18 | (2009.01) |
| H04L 12/46 | (2006.01) |
| H04Q 9/02 | (2006.01) |
| H04Q 9/00 | (2006.01) |
| H04L 12/28 | (2006.01) |
| H04W 16/20 | (2009.01) |
| H04W 40/00 | (2009.01) |
| H04W 4/00 | (2009.01) |
| H04W 8/00 | (2009.01) |
| H04W 84/00 | (2009.01) |
| H04W 84/12 | (2009.01) |
| H04W 84/20 | (2009.01) |
| H04W 84/04 | (2009.01) |
| H04L 12/24 | (2006.01) |
| H04W 84/02 | (2009.01) |

(52) U.S. Cl.
CPC .......... *H04L 12/46* (2013.01); *H04L 12/2825* (2013.01); *H04L 12/2834* (2013.01); *H04Q 9/00* (2013.01); *H04Q 9/02* (2013.01); *H04W 84/18* (2013.01); *H04L 41/12* (2013.01); *H04Q 2209/70* (2013.01); *H04W 4/005* (2013.01); *H04W 4/008* (2013.01); *H04W 8/005* (2013.01); *H04W 16/20* (2013.01); *H04W 40/00* (2013.01); *H04W 84/00* (2013.01); *H04W 84/02* (2013.01); *H04W 84/04* (2013.01); *H04W 84/12* (2013.01); *H04W 84/20* (2013.01)

(58) Field of Classification Search
CPC ..................................................... H04W 84/20
See application file for complete search history.

(56) References Cited

U.S. PATENT DOCUMENTS

| | | | | |
|---|---|---|---|---|
| 2008/0031139 A1* | 2/2008 | Muro | ................... | H04W 28/08 370/237 |
| 2011/0030875 A1* | 2/2011 | Conte | ................... | G01V 15/00 156/64 |

(Continued)

Primary Examiner — Benyam Haile
(74) Attorney, Agent, or Firm — Brinks Gilson & Lione

(57) ABSTRACT

A telemetry network may be a communication network that comprises a plurality of telemetry devices. The plurality of telemetry devices may comprise a parent device and at least one child device. The parent device may be capable of sending data to and receiving data from an external network outside the communication network; and the child device may connect to the parent device and may be capable of sending data to and receiving data from the parent device and communicating with the external network via the parent device. Each telemetry device of the plurality of telemetry devices may provide an individual local network to end users.

19 Claims, 3 Drawing Sheets

(56) References Cited

U.S. PATENT DOCUMENTS

| | | | |
|---|---|---|---|
| 2011/0035059 A1* | 2/2011 | Ersavas | A01G 1/00 700/276 |
| 2011/0222480 A1* | 9/2011 | Perigo | H04W 16/26 370/328 |
| 2012/0102144 A1 | 4/2012 | Fritsche | |

* cited by examiner

MULTIPLE DEVICE TELEMETRY NETWORK

BACKGROUND

The invention relates to providing telemetry box, telemetry network, and method of forming the same that expands an external network from a network base station to remote location.

Telemetry is a widely used technology to measure and/or collect data from remote facilities, such as wind turbine towers, oil rigs on or off shore, cranes or other motorized movable vehicles, Zeppelin© or blimps or other flying machines. The technology is typically used to gather data from distant, inaccessible locations, or when data collection would be dangerous or difficult for a variety of reasons. Telemetered data can be physical, environmental or biological data. It can also be radio signals transmitted from a spacecraft to a ground station.

Often times a telemetry device is installed on a facility whose location is too remote to reach a reliable network, so that monitoring and/or communicating with this telemetry device becomes difficult from a monitoring center. For example, a telemetry device may be installed in a wind turbine tower in a mountain or an off shore oil rig where the nearest base station for a network, such as cellular network or satellite network, is too remote to establish a reliable network connection.

In order to overcome the above-described problems, a local network that expands a network from a network base station to a remote location may be needed.

SUMMARY

According to an example embodiment, a telemetry network may comprise a plurality of telemetry devices forming a communication network, wherein the plurality of telemetry devices may comprises a parent device being capable of sending data to and receiving data from an external network outside the local communication network; at least one child device connecting to the parent device, being capable of sending data to and receiving data from the parent device and communicating with the external network via the parent device; and each telemetry device of the plurality of telemetry devices providing an individual local network to end users.

According to an example embodiment, a method of forming a telemetry network comprises, from a plurality of telemetry devices, assigning a telemetry device as parent device, the parent device being capable of sending data to and receiving data from an external network outside the local communication network; assigning at least one telemetry device as at least one child device of the parent device, the at least one child device being connected to the parent device and being capable of sending data to and receiving data from the parent device and communicating with the external network via the parent device; and forming, via each telemetry device of the plurality of telemetry devices, an individual local network to end users.

According to an example embodiment, a telemetry box comprises a circuit capable of serving as a parent device or a child device devices in a telemetry network as described above.

BRIEF DESCRIPTION OF THE DRAWINGS

The system and method of operating the system of the present application may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

By way of introduction, it is maintained that in the differently described embodiments, identical parts are provided with the same reference symbols, wherein the disclosures contained in the overall description the same reference symbols or same component symbols can be applied to identical parts.

DETAILED DESCRIPTION OF EXAMPLE EMBODIMENTS

Figure 1:
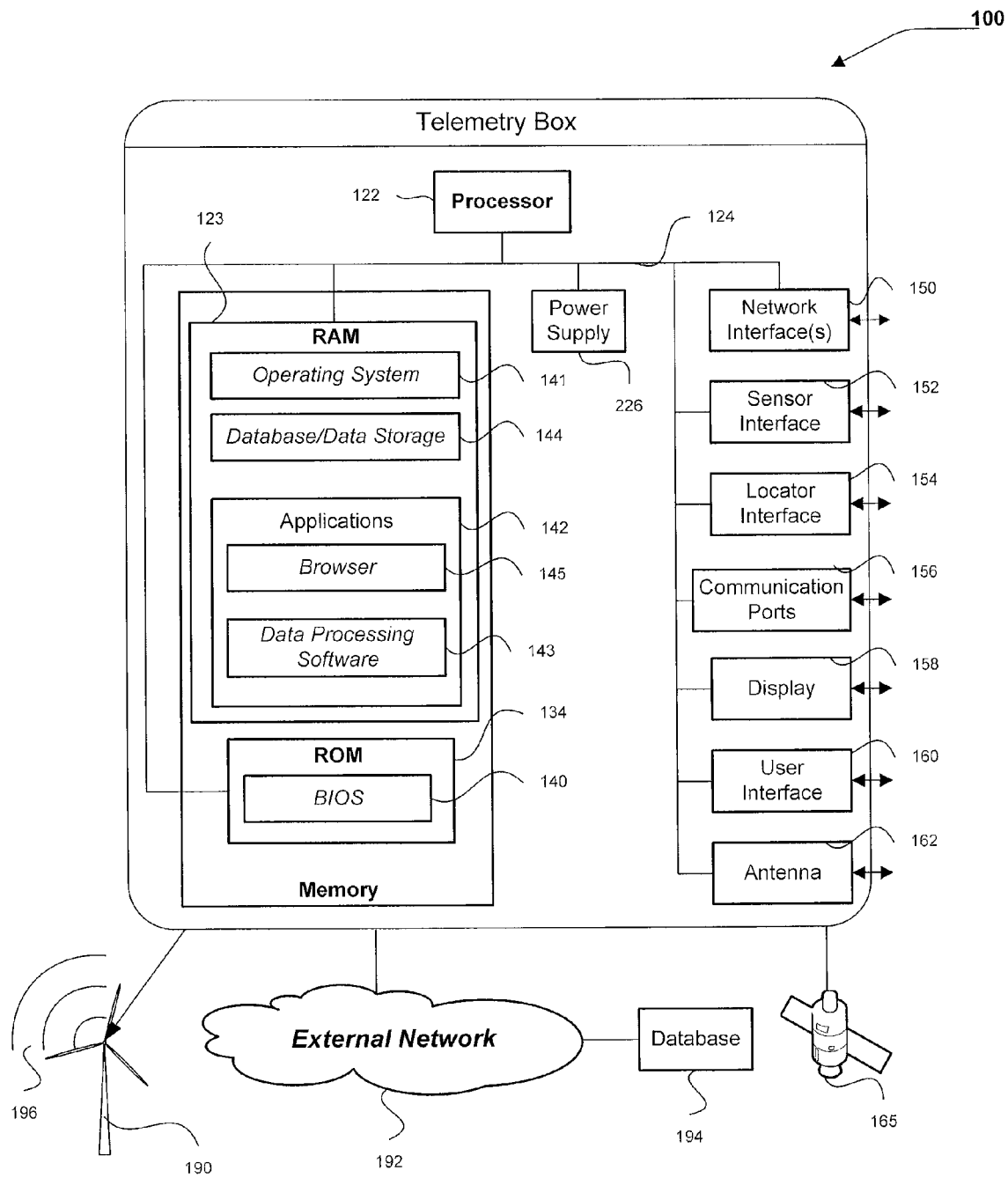
FIG. 1 is a schematic diagram illustrating an example embodiment of a telemetry box according to the application.

FIG. 1 is a schematic diagram illustrating an example embodiment of a telemetry box 100, which may be used to form a telemetry network. The telemetry box may be mounted on an external facility 190. The exemplary external facility 190 shown in FIG. 1 is a wind turbine tower. However, the external facility may take any number of forms, including, as examples, an on or off shore oil rig, or a movable structure such as a crane, bus, truck, van, sport utility vehicle (SUV), helicopter, airplane, construction vehicle, boat, trailer, all-terrain vehicle (ATV), motorcycle, moped, tractor, hybrid vehicle, electric vehicle, ambulance, marine vessel, boat, submarine, or other motorized movable vehicle, or Zeppelin©, blimp, or other flying machines.

According to the embodiment, the telemetry box 100 may include circuits of communication ports 156, a processor 122, database 144, memory 123 that may store instructions or data, sensor interface 152, and locator interface 154.

Telemetry box 100 may communicate with any number of external networks 192 via the communication ports 156, including, but not limited to, a communication network, which may take any number of forms such as a cellular network, a satellite network, or a wired or wireless Local Area Network (LAN) connected to an internet or private network. The telemetry box 100 may communicate according to any number of communication protocols, standards, networks, or topologies. As examples, the telemetry box 100 may communicate across cellular networks or standards (e.g., 2G, 3G, 4G Universal Mobile Telecommunications System (UMTS), GSM® Association, Long Term Evolution (LTE)™, or more), WiMAX, Bluetooth, Wireless Fidelity (Wi-Fi, including 802.11a/b/g/n/ac or others), WiGig, Global Positioning System (GPS) networks, and others available at the time of the filing of this application or that may be developed in the future. The telemetry box 100 may include processing circuitry, data ports, transmitters, receivers, transceivers, or any combination thereof to communicate across any of the above-listed protocols, standards, networks, or topologies.

The telemetry box 100 may also create its own wired and/or wireless networks for two layers of communications. First, the telemetry box 100 may detect, establish connection with, and be able to send data to and/or receiving data from another telemetry box (hereinafter "the second telemetry box", not shown) nearby, which may or may not have a network connection to the external network 192, thereby telemetry box 100 may serve as a hub of the second telemetry box to the external network 192 and expand the external network 192 to where the second telemetry box is located. Conversely, in the event that the telemetry box 100 does not have a network connection to the external network 192, it may search and establish a connection to the second telemetry box, which has network connection directly or indirectly to the external network, and send data to and/or receive data from the second telemetry box.

Second, the telemetry box 100 may also create its own local network 196 and may communicate with or provide communication channels for its own end users (not shown) and communication devices, which may be any type of communication devices within the range of the network created by the telemetry box 100. In one example embodiment, the telemetry box 100 may implement a local network accessible by any type of communication devices, which may take the form of a wired and/or wireless local area network (LAN/WLAN/Wi-Fi) or a wireless access point. Communication devices, such as hand-held smart phones, mobile phones, tablets, laptops, or other devices, may communicate directly with the telemetry box 100 through the local network 196 or communicate with each other through the local network 196. Alternatively, the telemetry box 100 may communicate with the communication devices indirectly, e.g., through one or more external communication networks, such as a cellular network.

The telemetry box 100 may be configured according to any number of user requirements with respect to communication capabilities, data transfer configurations, data collection configurations, and other configurations. The telemetry box 100 may be altered locally or remotely through the external network 192. The telemetry box 100 may also collect any designated data, such as wind speed, weather information, diagnostic information, other monitoring data that may or may not be configured to trigger an alarm or an event, and performance statistics of the external facility 190, position data, and others. One example of telemetry box 100 is the Openmatics© on-board unit provided by ZF Friedrichshafen AG.

The telemetry box 100 may include sensor interface 152 that may interface with one or more sensors in the external facility 190. These sensors may include pressure sensors, gyroscopes, temperature sensors, voltage and current monitors, magnetic sensors, microelectromechanical sensors, mechatronic sensors, position sensors, and compass sensors. These sensors are merely exemplary and the embodiments are not limited to those sensors listed herein. Via sensor interface 152, telemetry box 100 may collect various operating parameters that may be stored in database 144, memory 123, or transmitted over communication network 150 and stored in database 194.

Database 194 may be operated or maintained by the operator of the external facility 190. Alternatively, database 194 may be operated or maintained by a third-party that may grant access to database 196 to commercial or private operators. Database 196 may be distributed, such as in a cloud of distributed, networked computer servers.

Telemetry box 100 also may include locator interface 154. Locator interface 154 may be a GPS receiver that is able to receive transmissions from GPS satellites providing a vehicle with a means to determine its location on the earth. The GPS coordinates may be used together with a map software to provide the vehicle and its occupants with an indication of where the vehicle is located along a roadway, waterway, or anywhere on a map provided by the map software. Locator interface 154 may receive GPS transmissions from satellite 165.

Telemetry box 100 may transmit the necessary data to another server and/or processor to perform the analysis. Further, telemetry box 100 may transmit the analysis results by way of user interface 160. Or, the analysis results may be transmitted to a server, processor, hand-held device, or personal computer to be displayed on a monitor, website, or user interface. In this way, persons other than the operator of the external facility 190 may receive the data and/or analysis from remote site.

The telemetry box 100 may vary in terms of capabilities or features. Claimed subject matter is intended to cover a wide range of potential variations. For example, the telemetry box may include an antenna 162 for sending out and/or receiving data/signals. It may also include a keypad/keyboard and/or a display 158, such as a monochrome liquid crystal display (LCD) for displaying text. In contrast, however, as another example, the telemetry box 100 may include one or more physical or virtual keyboards, mass storage, one or more accelerometers, one or more gyroscopes, or a display with a high degree of functionality, such as a touch-sensitive color 2D or 3D display, for example.

The telemetry box 100 may include or may execute a variety of operating systems 141, including a personal computer operating system, such as a Windows, iOS or Linux, or a mobile operating system, such as iOS, Android, or Windows Mobile, or the like. The telemetry box 100 may include or may execute a variety of possible applications 142, such as a browser 145 and/or data processing software 143. A telemetry box application 142 may enable communication with other devices, such as data transmission and/or exchange with another telemetry box, a cell phone base station, or a satellite via a wired or wireless network. The telemetry box 100 may also include or execute an application to perform a variety of possible tasks, such as browsing, searching, or exchanging various data with other devices, or controlling a device on which the telemetry box is mounted or on a remote facility that the telemetry box may reach via a wired or wireless network.

Alternatively, the telemetry box 100 may be a specially programmed desktop computer or portable device capable of achieve the above functionality. The portable device may be of any form available at the time of the application, such as a cellular telephone or a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Overall, the foregoing is provided to illustrate that claimed subject matter is intended to include a wide range of possible features or capabilities.

Figure 2:
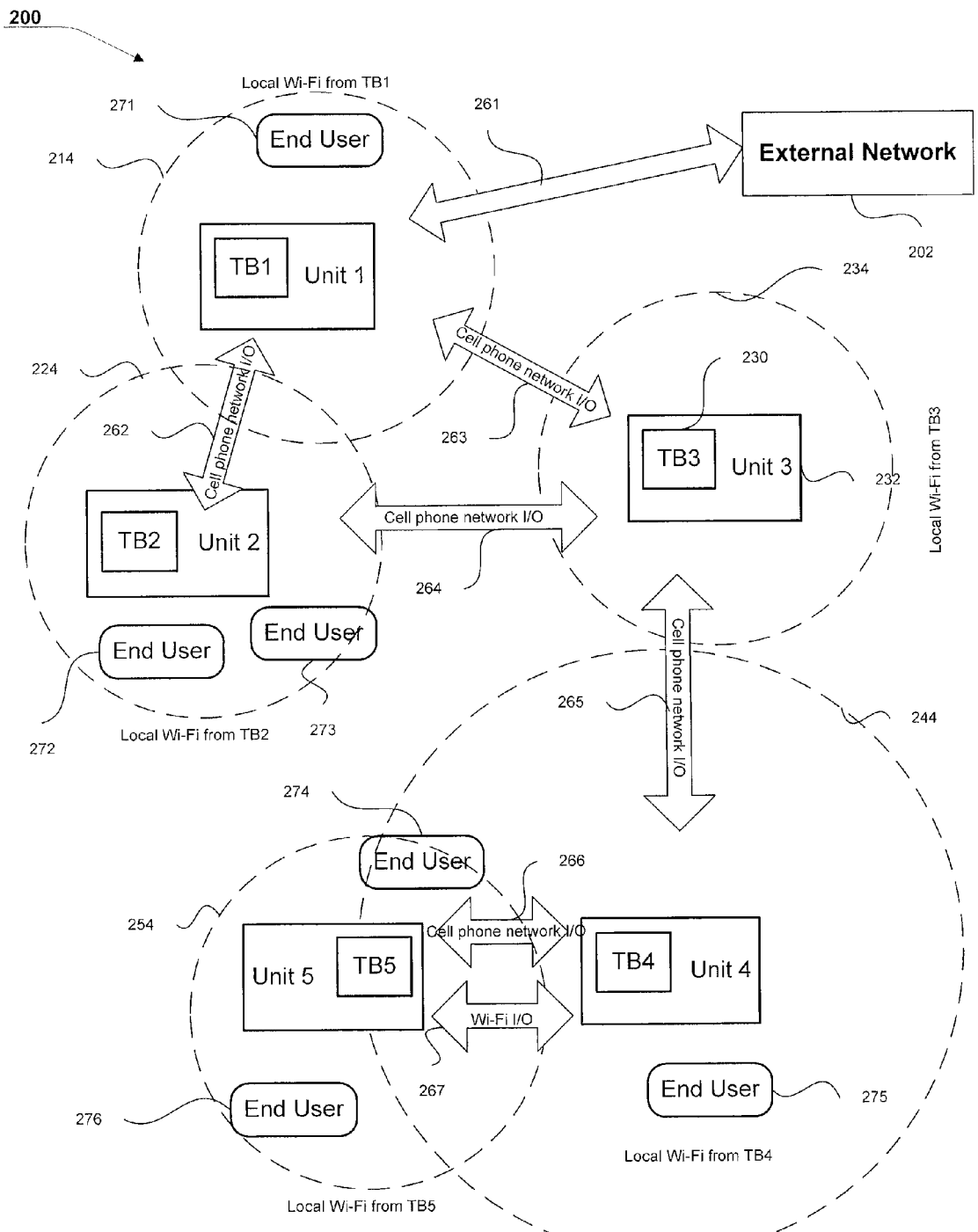
FIG. 2 is a schematic diagram illustrating a telemetry network, according to an embodiment of the application.

FIG. 2 is a schematic diagram illustrating an example embodiment of a telemetry network. According to the example embodiment, a telemetry network 200 may comprise a plurality of telemetry boxes TB1, TB2, TB3, TB4, and TB5, forming a local communication network. The telemetry boxes TB1-TB5 may be identical with respect to each other or may be different versions of same series of product, or alternatively may be telemetry box products from different brands.

Each telemetry box TB1-TB5 may attach to an external facility Unit 1, Unit 2, Unit 3, Unit 4, and Unit 5, respectively. For example, telemetry box TB1 may be mounted on an external facility Unit 1, and telemetry box TB5 may be mounted on an external facility Unit 5.

The external facilities Unit 1-Unit 5 may be any form of movable or non-movable structures or combination thereof. For example, the external facilities may be, but not limited to, non-movable structures such as wind turbine towers, on or off shore oil rigs, or movable structures such as cranes or other motorized movable vehicles, or Zeppelin©, blimps, or other flying machines.

The external facilities Unit 1-Unit 5 may be close enough so that each telemetry box TB1-TB5 may be able to communicate with at least one other telemetry box via its antenna. For example, in FIG. 2, Unit 1 may be close to Unit 2 and Unit 3 so that Unit1 may be able to communicate with Unit 2 and Unit 3 via wired and/or wireless connections 262, 263, respectively; Unit 3 may be close to Unit 2 and Unit 4 so that telemetry box TB3 may be able to communicate with telemetry boxes TB2 and TB4 via wired and/or wireless connections 264, 265, respectively; and Unit5 may be close Unit4 so that telemetry box TB5 may be communicate with telemetry box TB4 via wired and/or wireless connections 266, 267, respectively. Further, telemetry boxes TB4, TB5 may be located far enough away that they may be unable to establish a wired and/or wireless connection with the telemetry boxes TB1, TB2. The wired and/or wireless connections 261-266 may be any form of communications for data transmission at the time of filing of this application or available in the future. In one implement, the wired and/or wireless connections 261-266 may be, but not limited to cellular network connections, Wi-Fi connection, Bluetooth connection, internet connections, radio frequency connections, optical connections (via light/laser), or satellite connections.

Each telemetry box may be configured to require manual setup in order to sense and dynamically adjust its respective connections with respect to other telemetry boxes nearby, according to the position and characters of available connections of the telemetry box. Alternatively, each telemetry box may be configured to automatically sense and dynamically adjust its respective connections with respect to other telemetry boxes nearby according to the position and characters of available connections of the telemetry box. For example, if the external facility Unit 4 in FIG. 2 is movable (e.g., a motorized movable vehicle such as a crane or a cruise ship, or a flying machine such as a Zeppelin© or blimp.) and moves into a new location so that telemetry box TB4 and telemetry box TB2 become close enough to establish a new connection, at least one of the telemetry boxes TB2 and TB4 may automatically sense the presence of the other telemetry box and dynamically establish a new connection with the other telemetry box. Factors that may affect establishing the connection may be signal strength, data transmission stability, data transmission security, etc.

When two telemetry boxes connect to each other, a form of authentication may or may not be required to establish the connection in order to prevent entangling with a different network in the same area. For example, if the external facility Unit 4 in FIG. 2 is movable (e.g., a motorized movable vehicle such as a crane or a cruise ship, or a flying machine such as a Zeppelin© or blimp.) and moves into a new location so that it becomes close to a telemetry box TBX (not shown) that belongs to telemetry network X (not shown) other than the telemetry network 200, TBX may not establish a connection with TB4 unless TBX can pass the authentication required by TB4. As a result, unwanted network entanglement may be avoided and the telemetry network 200 and the telemetry X may coexist in a same area without interfering with each other.

Further, the telemetry box TB1 may locate close to an external network base station and be able to access an external network 202, such as cellular network, satellite network, or the internet, outside the telemetry network 200 via a wired and/or wireless connection 261. Other telemetry boxes TB2-TB5 in the telemetry network 200 may be located in remote areas where no connections are unavailable to the external network 202, as shown in FIG. 2.

To expand the range of the external network 202, according to the example embodiment shown in FIG. 2, one of the telemetry boxes TB1 may serve as a parent device for the rest of the plurality of telemetry boxes TB2-TB5 in the telemetry network 200, and the rest of the plurality of telemetry boxes TB2-TB5 may serve as child devices for the parent device TB1. As the parent device, the telemetry box TB1 may be capable of directly sending data to and receiving data from both the external network 202 and the child devices TB2, TB3. Thereby the parent device TB1 may serve as a hub of the child devices TB2, TB3 to the external network 202 and expand the external network 202 to where the child devices TB2, TB3 are located.

Moreover, a child device may also serve as a sub-parent device of other child devices. For example, child device TB4 may not have a direct connection with the parent device TB1 but may be located close enough to establish a connection 265 with the child device TB3. Child device TB3 then may serve as a sub-parent device for the child device TB4 and transmit data between the child device TB4 and the external network 202 through the parent device TB1. In a similar manner, child device TB5 may also send data to and/or receive data from the external network 202 through child devices TB4, TB3, and TB1.

The sub-parent device may be dynamically selected from the plurality of telemetry boxes TB1-TB5 to optimize the overall performance of the telemetry network in connection with the external network 202. For example, if the telemetry box TB2 is mounted on a movable external facilities (e.g., a motorized movable vehicle such as a crane or a cruise ship, or a flying machine such as a Zeppelin© or blimp.) and moves into a new location so that a connection between telemetry box TB2 and telemetry box TB5 becomes available, the system may dynamically select the telemetry box TB2 as a sub-parent device of the telemetry box TB5 if the overall performance of the telemetry network 200 is improved by doing so. Factors that may be used to determine the overall performance of the telemetry network may include, but not limited to, signal strength, data transmission stability, security, relay efficiency, and speed, etc.

Hence in the telemetry network 200, the parent device TB1 may necessarily be connected to the external network 202 and the rest of child devices TB2-TB5 may communicate in relay to one another to the external network 202 via the parent device TB1. Consequently, the telemetry network 200 may expand the range of the external network 200 to where the external facilities Unit 2-Unit 5 are located.

The parent device may also be dynamically selected from the plurality of telemetry boxes TB1-TB5 optimize of the overall performance of the telemetry network in connection with the external network 202. For example, if the telemetry box TB2 is mounted on a movable external facilities (e.g., a motorized movable vehicle such as a crane or a cruise ship, or a flying machine such as a Zeppelin© or blimp.) and moves into a new location so that a second connection to the external network 202 is available, the system may dynamically select the telemetry box TB2 as the parent device if the overall performance of the telemetry network 200 is improved by doing so. Factors that may be used to determine the overall performance of the telemetry network may include, but not limited to, signal strength, data transmission stability, security, relay efficiency, and speed, etc.

Alternatively, the plurality of telemetry boxes TB1-TB5 may function autonomously without connection to the external network 202, forming an expanded private telemetry network 200.

In addition, if a new telemetry box (not shown) which originally is not part of the telemetry network 200 moves into a location that is close enough to establish a connection with one of the telemetry boxes TB1-TB5, the telemetry network 200 may incorporate the new telemetry box into the local communication network. If the telemetry network 200 is configured to be open to only authorized telemetry boxes, however, only those who pass the authentication may be incorporated into the telemetry network 200. The new telemetry box may serve as a parent device, sub-parent device, or a child device.

Furthermore, each telemetry box TB1-TB5 may create its own local network for end users nearby for various performances. For example, in an example shown in FIG. 2, the telemetry box TB1 may create a local network 214 for an end user 271; the telemetry box TB2 may create a local network 224 for end users 272, 273; the telemetry box TB4 may create a local network 244 for end users 274, 275; and the telemetry box TB5 may create a local network 254 for end users 274 and 276.

The local networks 214, 224, 234, 244, and 254 may be configured to remain open to any suitable end users. Alternatively, the local networks 214, 224, 234, 244, and 254 may be configured to be open to only qualified users and require authentication or security credentials, such as user ID and password, to login, so that only defined telemetry boxes are permitted to enter the local network. The local network may be of any form available at the time of the filing of this application or that may be developed in the future. For example, the local network may take the form of a wired and/or wireless local area network (LAN/WLAN/Wi-Fi) or a wireless access point. In an implement shown in FIG. 2, the telemetry box TB1-TB5 are configured to be secure wireless hotspots and/or cell phone transmitters, and each of the local networks 214, 224, 234, 244, and 254 is a Wi-Fi network.

The end users 271-276 may be any form of equipment and/or devices that may connect to the local networks 214, 224, 234, 244, and 254 at time of the filing of the application or that may be developed in the future. For example, an end user may be a computing device capable of sending or receiving signals, such as via a wired or a wireless network. An end user may, for example, be a sensor, a monitoring device, a diagnostic device, a desktop computer or a portable device, such as a cellular telephone or a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Each individual local network 214, 224, 234, 244, and 254 may provide each end user 271-276 network access to the external network 202, or to perform actions, such as perform diagnostic, updates, or other tasks, on the telemetry box TB1-TB5 that generates the individual network 214, 224, 234, 244, and 254. The individual local networks 214, 224, 234, 244, and 254 may allow the end users to only communicate back to its corresponding telemetry box TB1-TB5.

Alternatively, an individual local network 214, 224, 234, 244, and 254 of a telemetry box TB1-TB5 may provide network communications between the end users 271-276 within the individual local network 214, 224, 234, 244, and 254 of the telemetry box TB1-TB5. Further, an individual local network 214, 224, 234, 244, and 254 may also provide network communications between an end user in the individual network of the telemetry box TB1-TB5 and an individual network of another telemetry box TB1-TB5. For example, in FIG. 2, the Wi-Fi network 244 may provide mutual communications between end user 274 and end user 275, who are both in the range of the Wi-Fi network 244; the Wi-Fi network 244 may also provide mutual communications between end user 274 and end user 272, who is located within another Wi-Fi network 224, through the connection between telemetry boxes TB2, TB3, and TB4.

If a new end user moves into the range of a local network of a telemetry box, the telemetry box may sense and dynamically connect the new end user into its local network and/or the telemetry network. Sensing of the new end user may be automatic, or may require manual setup in the telemetry box of the local network. The new end user may be free to connect to the local network, or authentication may be required in order for the new end user to connect to the local network.

In the event that an end user is within the ranges of two or more local networks, such as the end user 274 in FIG. 2, who is within the range of both Wi-Fi network 244 and Wi-Fi network 254, the corresponding telemetry boxes TB4 and TB5 may be able to determine which local networks 244, 254 is optimal to the end user, taking into account factors such as signal strength, number of other telemetry boxes to relay in order to reach the external network 202, data transmission stability, data transmission security, and preference of the end user, etc. For example, the telemetry box TB4, rather than TB5, may be determined to provide Wi-Fi connection to the end user 274 if the end user 274 prefers to use the specific telemetry box TB4 to perform diagnostic, updates, or other tasks.

In addition, when the distance between two telemetry boxes is short enough such that one telemetry box is within the range of the local network of another telemetry box, the two telemetry boxes may be able to connect to each other via the local network or via the telemetry network connection between the two telemetry boxes, whichever is optimal. For example, in an example shown in FIG. 2, if telemetry box TB5 is within the range of local network 244 generated by the telemetry box TB4, the connection between the telemetry box TB4 and telemetry box TB5 may be either the wired and/or wireless connection 266 or the Wi-Fi network connection 267, whichever is optimal for data transmission, taking into account factors such as signal strength, data transmission stability, and data transmission security, etc.

Methods or processes may be implemented, for example, using a processor and/or instructions or programs stored in a memory. Specific components of the disclosed embodiments may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters, databases, and other data structures may be separately stored and managed, may be incorporated into a single memory or database, or may be logically and physically organized in many different ways. Programs or instruction sets may be parts of a single program, separate programs, or distributed across several memories and processors.

Figure 3:
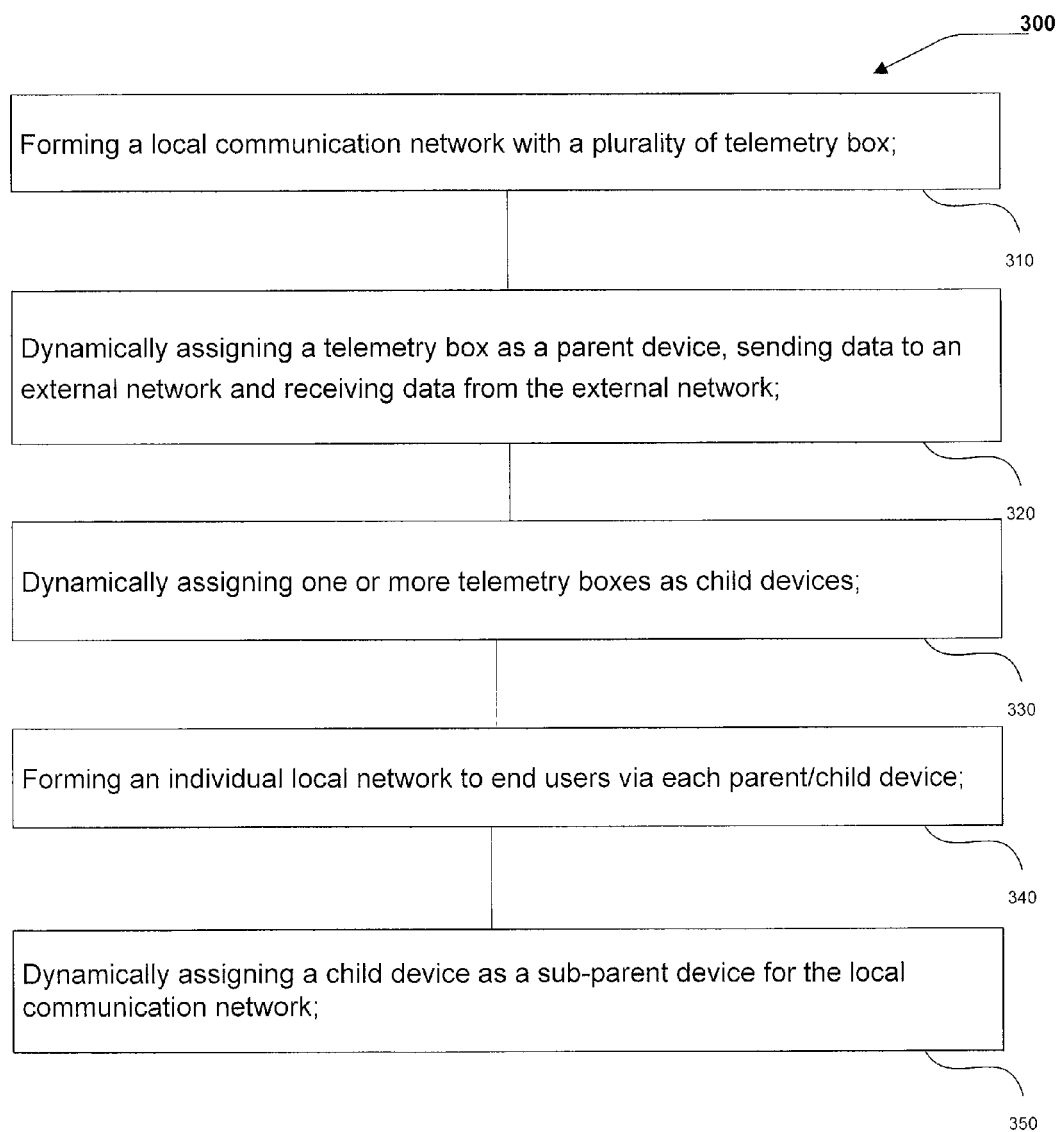
FIG. 3 is a flow diagram of a method of forming a telemetry network according to an example embodiment of the application.

FIG. 3 is a flow diagram illustrating a method of forming a telemetry network according to an example embodiment of the application. In step 310, the method may comprise forming a local communication network with a plurality of telemetry boxes. For example, in one of example embodiment illustrated in FIG. 2, the telemetry network 200 may be formed by the plurality of telemetry boxes TB1-TB5. Each telemetry box may be configured as the telemetry box 100 as shown in FIG. 1.

In step 320, the method may comprise assigning one of the plurality of telemetry device as a parent device for the local communication network, wherein the parent device may be able to send data to and receive data from an external network outside the local communication network. For example, in one of example embodiment illustrated in FIG. 2, the telemetry TB1 may be assigned as the parent device.

In step 330, the method may comprise dynamically assigning at least one of the plurality of telemetry devices as child device of the parent device, wherein the child device may be connected to the parent device and capable of sending data to the parent device and receiving data from the parent device and communicate with the external network via the parent device. For example, in one of example embodiment illustrated in FIG. 2, at least one of the telemetry boxes TB2 and TB4 may automatically sense the presence of the other telemetry box and dynamically establish a new connection with the other telemetry box. Thus, the connections between different child devices may be dynamically adjusted. Further, if a new telemetry box (not shown) which originally is not part of the telemetry network 200 moves into a location that is close enough to establish a connection with one of the telemetry boxes TB1-TB5, the telemetry network 200 may incorporate the new telemetry box into the local communication network.

In step 340, the method may comprise forming an individual local network to end users via each telemetry device of the plurality of telemetry devices. For example, in one of example embodiment illustrated in FIG. 2, the telemetry box TB1 may create a local network 214 for an end user 271; the telemetry box TB2 may create a local network 224 for end users 272, 273; the telemetry box TB4 may create a local network 244 for end users 274, 275; and the telemetry box TB5 may create a local network 254 for end users 274 and 276.

In step 350, the method may comprise dynamically assigning one of the child devices as a sub-parent device. For example, in one of example embodiment illustrated in FIG. 2, the child device TB4 may not have a direct connection with the parent device TB1 but may be located close enough to establish a connection 265 with the child device TB3. The child device TB3 thus may be assigned as a sub-parent device for the child device TB4 and transmit data between the child device TB4 and the external network 202 through the parent device TB1.

As described above, telemetry boxes, telemetry network systems, and methods of forming the same may expand an existing network to a remote area. The telemetry network system may comprise a plurality of telemetry devices. A telemetry device may serve as a parent device, being capable of sending data to and receiving data from an external network outside the local communication network. At least one telemetry device may serve as at least one child device connecting to the parent device and being capable of sending data to and receiving data from the parent device and communicating with the external network via the parent device; and each telemetry device of the plurality of telemetry devices providing an individual local network to end users.

While various embodiments of the invention have been described, it will be apparent to those of ordinary skill in the art that many more embodiments and implementations are possible within the scope of the invention. It is intended that the foregoing detailed description be regarded as illustrative rather than limiting, and that it be understood that it is the following claims, including all equivalents, that are intended to define the spirit and scope of this invention.

The invention claimed is:

1. A telemetry network, comprising:
a plurality of telemetry devices forming a communication network between a plurality of external facilities, wherein at least two external facilities are wind turbine towers, the plurality of telemetry devices comprising:
a parent telemetry device capable of sending data to an external network outside the communication network and receiving data from the external network, wherein the parent telemetry device is dynamically selected from the plurality of telemetry devices to optimize performance of the telemetry network; and
at least one child telemetry device, wherein the at least one child telemetry device is capable of sending data to the parent telemetry device and receiving data from the parent telemetry device and communicating with the external network via the parent telemetry device through a network,
wherein the at least one child telemetry device is capable of sending data to another child telemetry device and receiving data from another child telemetry device through the network; and
wherein each telemetry device of the plurality of telemetry devices is mounted to one of the external facilities and provides an individual local Wi-Fi network to end users.

2. The telemetry network according to claim 1, further comprising a plurality of parent telemetry devices, wherein the plurality of telemetry devices further comprises a sub-parent telemetry device that is a child telemetry device of the parent telemetry device and is a parent telemetry device of at least one child telemetry device.

3. The telemetry network according to claim 1, wherein the external network is one of a cellular network, a satellite, a Local Area Network (LAN), and a Wireless Fidelity (Wi-Fi) network.

4. The telemetry network according to claim 1, wherein the parent telemetry device is located within a communication range of the external network and the at least one child telemetry device is located outside the communication range of the external network.

5. The telemetry network according to claim 1, wherein a telemetry device of the plurality of telemetry devices is movable with respect to the wind turbine towers, and wherein the dynamic selection of the parent telemetry device is at least partially based on the location of the movable telemetry device.

6. The telemetry network according to claim 2, wherein the sub-parent telemetry device is dynamically selected from the at least one child telemetry device of the parent telemetry device to optimize performance of the telemetry network.

7. The telemetry network according to claim 1, further comprising dynamically incorporating a movable telemetry device into the telemetry network when the movable telemetry device enters the communication network.

8. A method of forming a telemetry network, the telemetry network comprising a plurality of telemetry devices, wherein at least two of the telemetry devices are coupled to wind turbine towers, the method comprising:
assigning a telemetry device as a parent device, the parent device being capable of sending data to an external network outside a local communication Wi-Fi network provided by the parent device and receiving data from the external network, wherein the parent device is dynamically selected from the plurality of telemetry devices to achieve an optimal performance of the telemetry network; and
assigning at least one telemetry device as an at least one child device of the parent device, the at least one child device being connected to the parent device through a network and being capable of sending data to the parent device and receiving data from the parent device and communicating with the external network via the parent device,
wherein each of the plurality of telemetry devices is capable of serving as a parent device and a child device, and wherein each of the plurality of telemetry devices mounted with a separate external facility.

9. The method of forming a telemetry network according to claim 8, wherein the at least one child device is capable of sending data to another child device and receiving data from another child device; and
forming an individual local Wi-Fi network to end users via each telemetry device of the plurality of telemetry devices.

10. The method of forming a telemetry network according to claim 8, further comprising a plurality of parent telemetry devices and further comprising assigning one of the at least one child device as a sub-parent device, wherein the sub-parent device is a parent device of at least one child device.

11. The method of forming a telemetry network according to claim 8, wherein the external network is one of a cellular network, a satellite, a Local Area Network (LAN), and a Wireless Fidelity (Wi-Fi) network.

12. The method of forming a telemetry network according to claim 8, wherein the parent device is located within a communication range of the external network and the at least one child device is located outside the communication range of the external network.

13. The method of forming a telemetry network according to claim 8, further comprising moving at least one telemetry device with respect to the wind turbine towers and switching the assignment of the parent device from one telemetry device to another.

14. The method of forming a telemetry network according to claim 10, wherein the sub-parent device is dynamically selected from the at least one child device of the parent device achieve an optimal performance of the telemetry network.

15. A telemetry box, comprising:
a circuit capable of serving as a parent device or a child device in a telemetry network, the circuit configured for mounting to and communicating with a wind turbine tower, the circuit including a user interface, a database, and data processing software for analyzing sensor data collected from at least one sensor of the wind turbine tower and stored in the database; and
the telemetry network comprising:
at least one telemetry device that is movable with respect to the wind turbine tower;
a parent telemetry device capable of sending data to an external network outside a local communication network and receiving data from the external network outside; and
at least one child telemetry device, wherein the at least one child telemetry device is capable of sending data to the parent telemetry device through a network and receiving data from the parent telemetry device and communicating with the external network via the parent telemetry device,
wherein the parent telemetry device is dynamically selected from a plurality of telemetry devices to achieve an optimal performance of the telemetry network, and wherein the selection of the parent telemetry device is at least partially based on the location of the at least one movable telemetry device.

16. The telemetry box according to claim 15, wherein the at least one child telemetry device is capable of sending data to another child telemetry device and receiving data from another child telemetry device; and
each telemetry device provides an individual local Wi-Fi network to end users.

17. The telemetry box according to claim 15, wherein the parent telemetry device is located within a communication range of the external network and the at least one child telemetry device is located outside the communication range of the external network.

18. The method of forming a telemetry network according to claim 8, further comprising communicating with a first external facility with the parent device and communicating with a second external facility with the child device.

19. The telemetry network of claim 1, wherein the telemetry devices coupled to the wind turbine towers each include a telemetry box, the telemetry box comprising a user interface, a database, and data processing software for analyzing sensor data collected from at least one sensor of the wind turbine tower and stored in the database.

* * * * *

UNITED STATES PATENT AND TRADEMARK OFFICE
CERTIFICATE OF CORRECTION

| | | |
|---|---|---|
| PATENT NO. | : 9,871,673 B2 | Page 1 of 1 |
| APPLICATION NO. | : 13/800251 | |
| DATED | : January 16, 2018 | |
| INVENTOR(S) | : Muetzel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this

Twenty-fifth Day of September, 2018

Andrei Iancu
*Director of the United States Patent and Trademark Office*